(12) United States Patent
Ramey et al.

(10) Patent No.: US 8,792,221 B2
(45) Date of Patent: Jul. 29, 2014

(54) ELECTRICAL PROTECTION CIRCUITRY FOR A DOCKING STATION BASE OF A HAND HELD METER AND METHOD THEREOF

(71) Applicant: Roche Diagnostics Operations, Inc., Indianapolis, IN (US)

(72) Inventors: Blaine Edward Ramey, Indianapolis, IN (US); Clint Alan Ecoff, Indianapolis, IN (US); Scott Allen Edwards, Greenfield, IN (US); Matthew Carlyle Sauers, Indianapolis, IN (US); James R. Kurtock, Fishers, IN (US); James Joseph Hartmann, Indianapolis, IN (US)

(73) Assignees: Roche Diagnostics Operations, Inc., Indianapolis, IN (US); Roche Operations, Ltd., Hamilton (BM)

( * ) Notice: Subject to any disclaimer, the term of this patent is extended or adjusted under 35 U.S.C. 154(b) by 0 days.

(21) Appl. No.: 13/891,799

(22) Filed: May 10, 2013

(65) Prior Publication Data

US 2013/0265682 A1     Oct. 10, 2013

Related U.S. Application Data

(63) Continuation of application No. 11/118,490, filed on Apr. 29, 2005, now abandoned.

(51) Int. Cl.
*H02H 3/20* (2006.01)
*H02H 3/24* (2006.01)
*H02H 3/08* (2006.01)
*H02H 9/08* (2006.01)

(52) U.S. Cl.
USPC ............ 361/90; 361/91.1; 361/92; 361/93.1; 361/93.9

(58) Field of Classification Search
USPC .......................... 361/90, 91.1, 92, 93.1, 93.9
See application file for complete search history.

(56) References Cited

U.S. PATENT DOCUMENTS

| 4,868,706 | A | | 9/1989 | Zaderej |
| 5,416,484 | A | * | 5/1995 | Lofstrom ..................... 341/159 |
| 5,448,151 | A | | 9/1995 | Ganse et al. |
| 5,617,010 | A | | 4/1997 | Higashijima et al. |

(Continued)

FOREIGN PATENT DOCUMENTS

| JP | 10174301 | * | 6/1998 |
| JP | 10174301 | A | 6/1998 |
| JP | 2003087981 | A | 9/2001 |

*Primary Examiner* — Jared Fureman
*Assistant Examiner* — Lucy Thomas
(74) *Attorney, Agent, or Firm* — Roche Diagnostics Operations, Inc.

(57) ABSTRACT

An electrical protection circuitry for a docking station base of a hand held meter and method thereof are disclosed. In the event of a short circuit at a meter interface connector, the protection circuitry removes power at the meter interface connector. Similarly, in the event of an applied voltage outside a specified operating range of the base, the protection circuitry removes power to the meter interface connector. These conditions of the electrical system of the base are monitored regardless whether the meter or the meter's battery is electrically connected to the base. The protection circuitry also provides a visual indication in the event of either the over current and under/over voltage conditions. Additionally, the base is designed to prevent liquid from pooling inside a pocket used to cradle and hold the meter in the base through the use of a drain located at the lowest point in the pocket.

23 Claims, 7 Drawing Sheets

(56) References Cited

U.S. PATENT DOCUMENTS

| | | |
|---|---|---|
| 5,644,211 A | 7/1997 | Tokuyama |
| 5,661,393 A | 8/1997 | Sengupta |
| 5,661,422 A | 8/1997 | Tice et al. |
| 5,675,240 A | 10/1997 | Fujisawa et al. |
| 5,804,944 A | 9/1998 | Alberkrack et al. |
| 5,982,140 A | 11/1999 | Toya et al. |
| 6,194,869 B1 | 2/2001 | Peterzell |
| 6,271,605 B1 | 8/2001 | Carkner et al. |
| 6,331,764 B1 | 12/2001 | Oglesbee et al. |
| 6,437,549 B1 | 8/2002 | Takagishi |
| 6,442,434 B1* | 8/2002 | Zarinetchi et al. ............. 607/61 |
| 6,608,470 B1 | 8/2003 | Oglesbee et al. |
| 6,653,820 B1 | 11/2003 | Smith |
| 6,752,514 B2 | 6/2004 | Parker |
| 6,788,202 B2* | 9/2004 | Holmes et al. ................ 340/541 |
| 6,888,338 B1* | 5/2005 | Popescu-Stanesti et al. . 320/137 |
| 7,041,468 B2* | 5/2006 | Drucker et al. ................ 435/14 |
| 2004/0135542 A1 | 7/2004 | Ito |
| 2005/0007711 A1* | 1/2005 | Liu et al. ......................... 361/90 |
| 2005/0017693 A1* | 1/2005 | Solie et al. .................... 320/162 |
| 2010/0235659 A1* | 9/2010 | Sawyers et al. ............... 713/320 |

\* cited by examiner

ELECTRICAL PROTECTION CIRCUITRY FOR A DOCKING STATION BASE OF A HAND HELD METER AND METHOD THEREOF

CROSS-REFERENCE TO RELATED APPLICATIONS

This application is a continuation of U.S. application Ser. No. 11/118,490, filed Apr. 29, 2005, which is hereby incorporated herein by reference in its entirety.

BACKGROUND OF THE INVENTION

The present invention relates generally to electrical protection, and in particular, to electrical protection circuitry for a docking station base of a hand held meter, such as for example a blood glucose meter, which prevents system damage from liquid contact and unspecified power supply voltages and currents, and the method thereof.

In hospitals and out-patient settings that desire to monitor and maintain a patient physiological values, there are a variety of hand held meters involved in bedside testing or near patient testing, which record and transmit such patient data to a remote health information system. One such hand held meter is a blood glucose meter, which in one prior art device, the transmission of patient data between the meter and the remote health information system is via a docking station base. In such a prior art device, the docking station base, in addition to providing a data connection to the information system, also provides power to recharge the battery of the meter. To connect the meter to the base, the meter is seated or docked in a cradle portion of the base having at the bottom thereof a meter interface connector. The meter interface connector provides both the power and data connections to the meter from the base.

Due to the use of such hand held meters in the near patient testing setting, customer usage includes periodic cleaning and disinfecting of the exterior surfaces of the meter and base. As the meter and base are not intended to be submerged in any liquid, the recommended cleaning process includes spraying a cloth with a cleaning solution and wiping down the meter and base with the dampened cloth. However, the problem induced to the combined meter and base system is that occasionally customers either clean the meter and base with an over-saturated cloth, or spray the meter and base directly with the cleaning solution which can result in significant residual cleaning solution being left on the meter and base. The excess solution, through help from gravity, collects in the cradle portion of the base or wicks down through the meter interface connector.

In such a prior art docking station base, if significant enough solution collects in the base, the cleaning solution can drain inside the base housing in and around the power and data connector and onto a printed circuit board enclosed therein. Once inside the housing, the cleaning solution (specifically bleach based products) can form dendrites on the wiring assembly of the printed circuit board which overtime, can eventually result in unit failure. In some cases, meter and/or base failure occurs almost immediately after solution application and docking of the meter to the base. In other cases, failure of the base is progressive, causing power fluctuations from an electrical short or other compromised circuitry which may unnoticeably jeopardize the operation of the meter. None of the prior art hand held meters having a docking station base addresses the problems of non-recommended cleaning practices and the application of unspecified power supply voltages and currents that may result therefrom.

SUMMARY OF THE INVENTION

It is against the above background that the present invention provides a number of advantages and advancements over prior art docking station bases for hand held meters. In particular, the present invention incorporates a unique electrical protection circuitry into the electrical system of a docking station base. The electrical protection circuitry, which automatically disconnects power from the meter interface connector under certain detected conditions, mitigates the risk of damage to the meter and base due to non-recommended cleaning practices and the application of unspecified power supply voltages and currents that may result therefrom. As dendrites are encouraged to grow on electrical connectors when a voltage is present, the electrical protection circuitry also provides protection against dendrite growth on the meter interface connector by automatically disconnecting power from the meter interface connector when the meter is undocked and the base is cleaned separately. Should a continued fault condition be indicated by the base, the present invention at a minimum mitigates the risk of damage to the more expensive meter by being also a less expensive replacement item in the combined meter and base system.

In one embodiment, in the event of a short circuit in the electrical system of the base, the protection circuitry according to the present invention removes power to a meter interface connector. Similarly, in the event of a voltage being outside a specified operating range of the electrical system of the base, the protection circuitry according to the present invention removes power to the meter interface connector regardless if the meter is connected to the base. Essentially, the electrical system of the base is monitored with or without the meter being docked to the base. Additionally, the protection circuitry provides a visual indication of the over-current and under/over voltage fault conditions.

In another embodiment, the base shape is designed to prevent liquid from pooling inside a cradle portion used to hold the meter in the base. In particular, the base shape design prevents ingress of a liquid, such as a cleaning solution, which may contact any electronic components inside the base in its intended orientation through the use of a drain located at the lowest point in the cradle portion. Liquid ingress is also addressed by a provided dam to the underside of the meter interface connector which provides an area to house a gasket material to seal the underside of the base housing around the meter interface connector.

These and other features and advantages of the invention will be more fully understood from the following description of various embodiments of the invention taken together with the accompanying drawings.

BRIEF DESCRIPTION OF THE DRAWINGS

The following detailed description of the embodiments of the present invention can be best understood when read in conjunction with the following drawings and in which.

DETAILED DESCRIPTION OF THE INVENTION

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on". Also, "battery" includes single cell batteries and multiple cell batteries.

Figure 1:
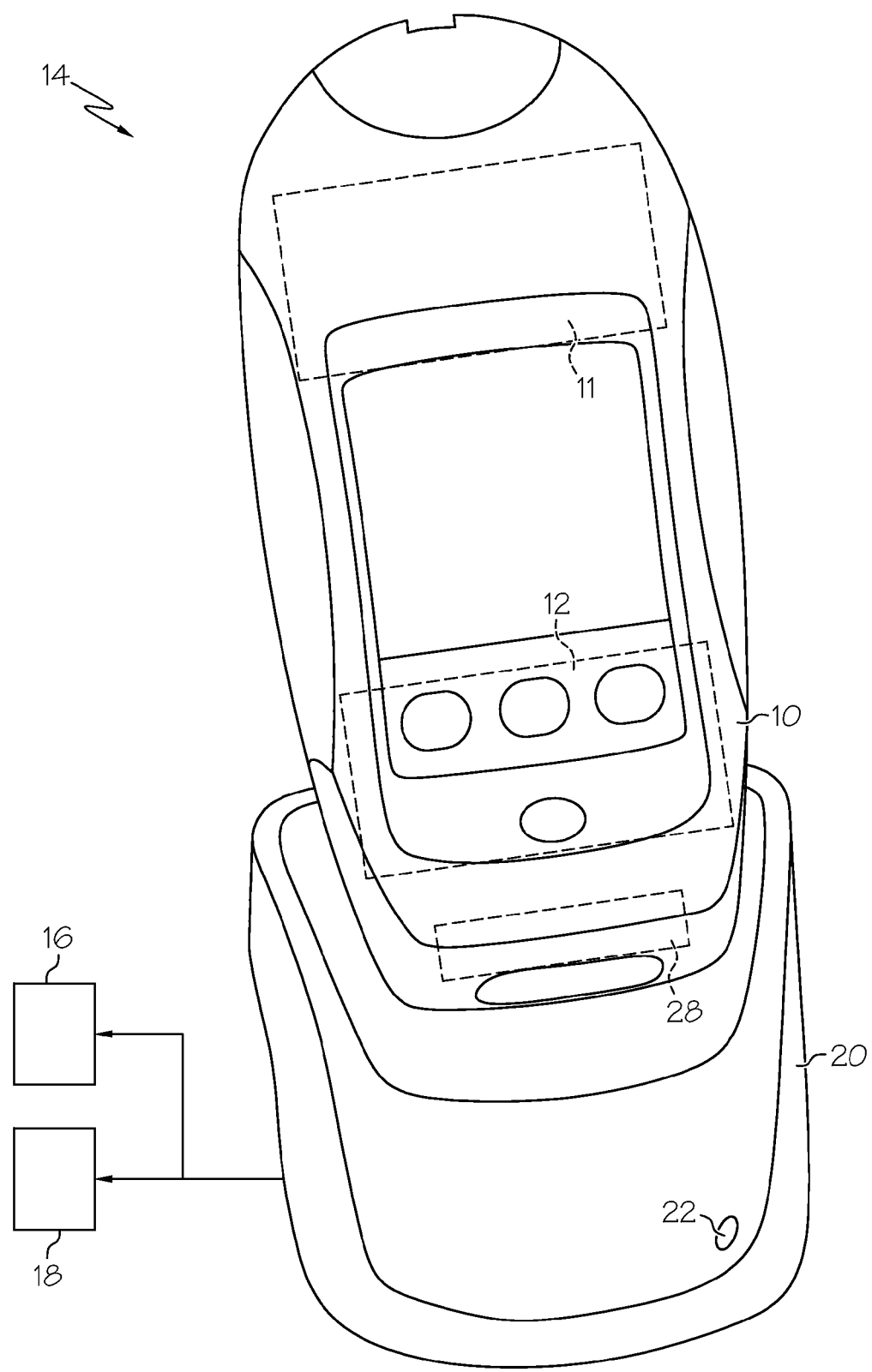
FIG. 1 is a front perspective view of a meter in a docking station base according to the present invention.

FIG. 1 is a front perspective view of a hand held meter 10 and a docking station base 20 according to the present invention. In the illustrated embodiment, the meter 10 is a hand held blood glucose meter, such as sold by Roche Diagnostics Corporation, under the trademark ACCU-CHEK® Inform. The meter 10 includes internal data processing and handling hardware, software, and firmware, generally indicated by symbol 11, which is all powered by an internal rechargeable battery 12. In other embodiments, the meter 10 may be any hand held patient diagnostic device, which can be connected to a docking station base for battery charging and for coupling the device to a remote system.

In the illustrated embodiment, the meter 10 and the base 20 together form a blood glucose monitoring system, generally indicated by symbol 14. Typically, such a system is used in hospitals and out-patient settings for Bedside Glucose Testing (BSGT) or Near Patient Testing (NPT) to maintain patient blood glucose values and quality control data, and to transmit such data to a hospital information system 16 or remote personal computer 18. Accordingly, the base 20 is a stationary platform that serves as a battery charging stand for the meter 10. Additionally, the base 20 serves as a conduit for transmitting data from the meter 10 through the base 20 to one of the remote system 16, 18. As the meter 10, information system 16, and personal computer 18 are conventional no further discussion is provided.

Focusing now on the present invention, the base 20 extends the functionality of prior art bases by providing extra safeguards against product malfunction in certain non-recommended usage conditions, such as cleaning the base with a non-recommended solution which can damage the internal circuit board if contact is made for extended periods of time. In particular, the base 20 provides fault protection for both improper voltage and current conditions. The base 20 provides a visual indicator 22 which functions to indicate to the user the detection of a fault condition, which is explained more fully in a later section.

Base Design

Figure 2:
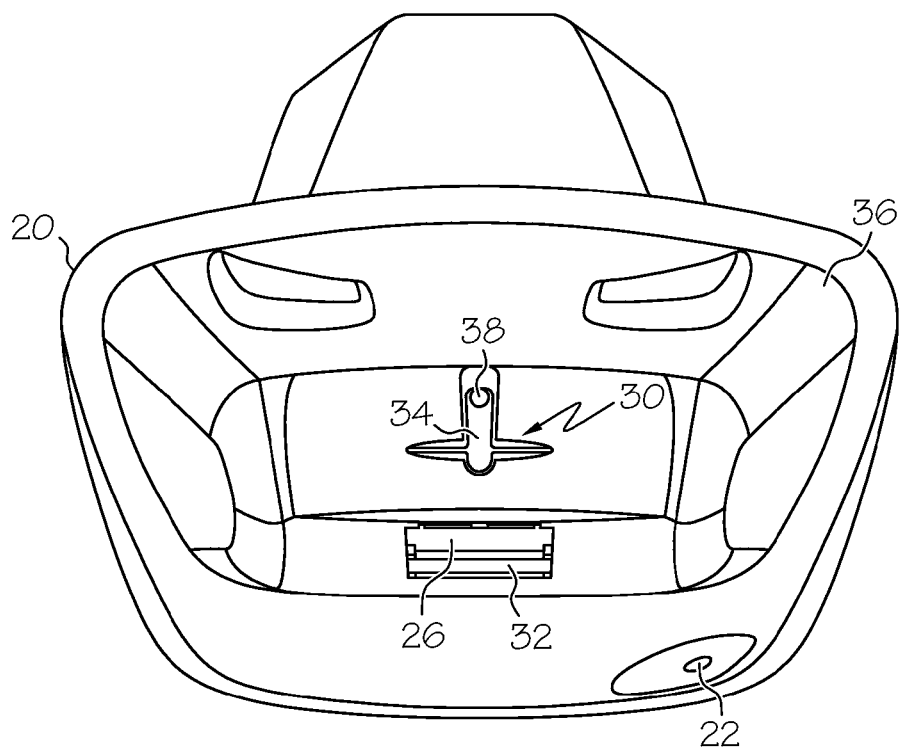
FIG. 2 is a top view of a docking station base according to the present invention.
Figure 3:
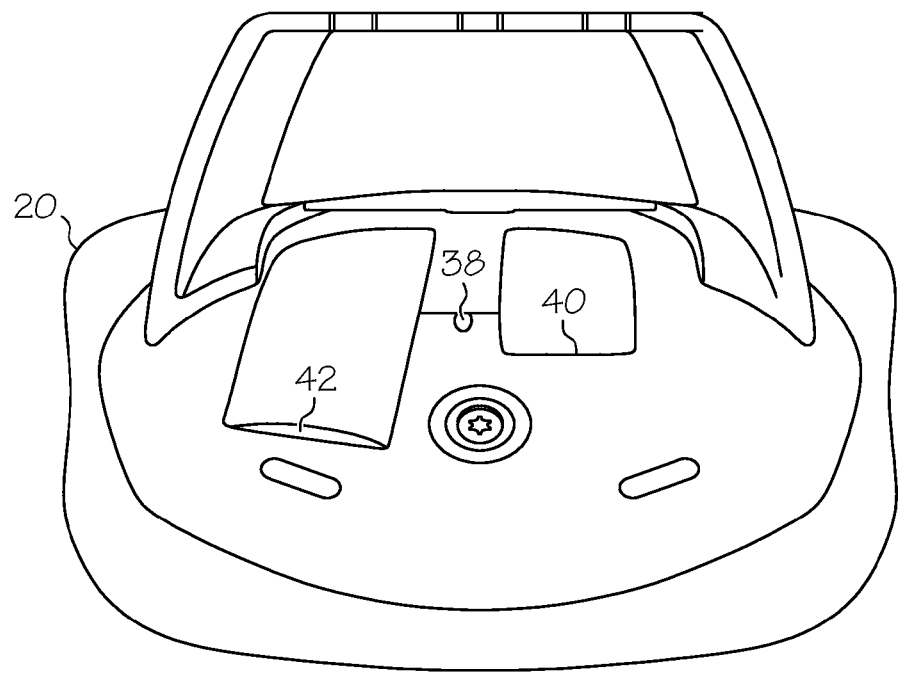
FIG. 3 is a bottom view of a docking station base according to the present invention.
Figure 4:
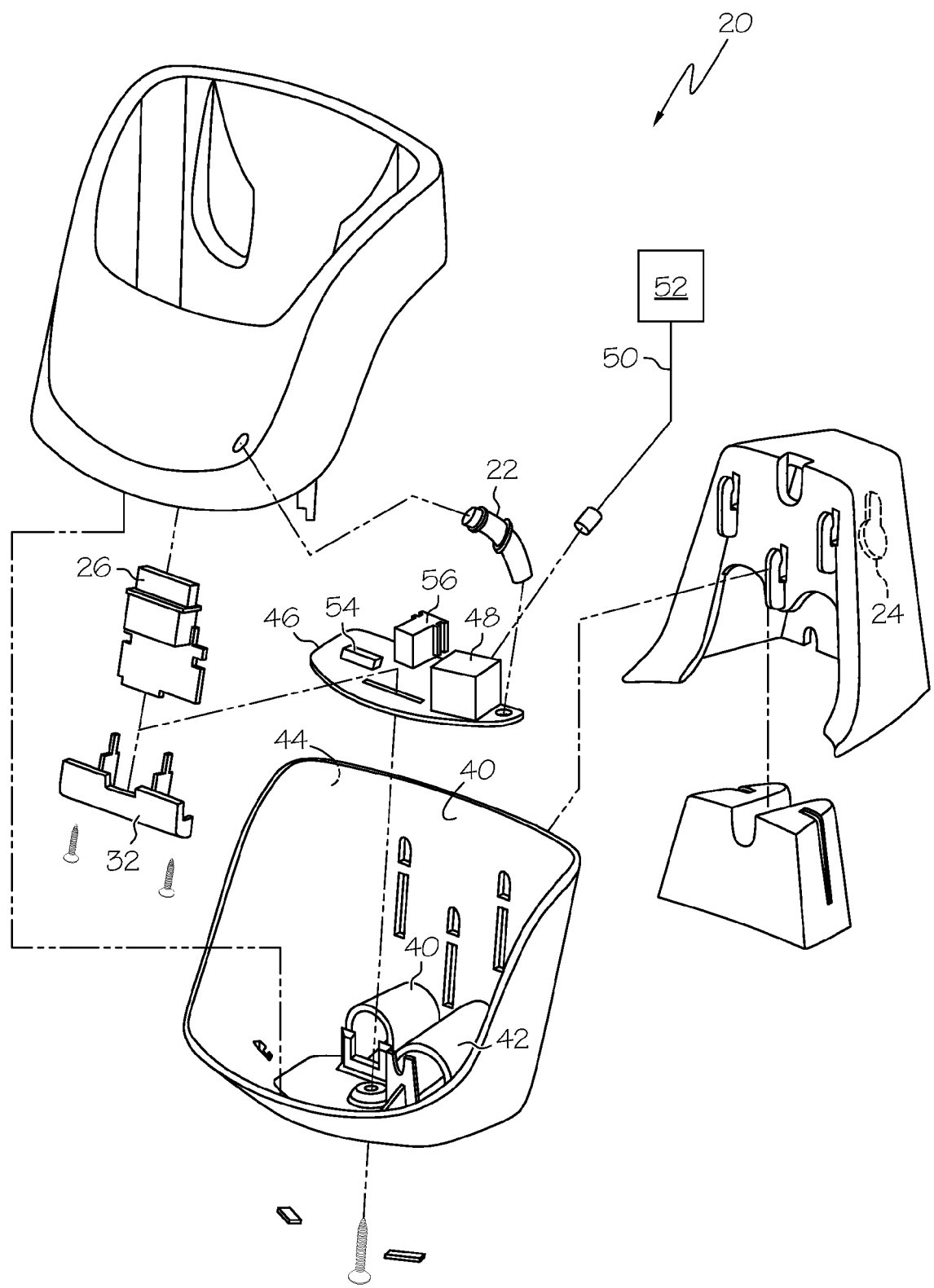
FIG. 4 is an exploded view of components forming a docking station base according to the present invention.

With reference made also to FIGS. 2-4, the base 20 is designed to be stable on a relatively horizontal desk-top. The base 20 is further designed such that the placement of the meter 10 into the base 20 does not allow the assembled components to topple in its intended orientation. The base 20 also includes a key-hole shaped opening 24 (FIG. 4) on a rear surface thereof such that the base may be fastened on a vertical wall surface, if desired.

In the illustrated embodiment, the base 20 includes a meter interface connector 26 (FIGS. 2 and 4) compatible with a base interface connector 28 (FIG. 1) of the meter 10. The meter interface connector 26 provides power for recharging the battery 12 and a data connection for coupling the meter 10 to the remote system 16 or 18. Also, the base 20 includes in its form a base drain 30 (FIG. 2) and connector dam 32 (FIG. 4). The base drain 30 and connector dam 32 address part of the problem of excessive cleaning solution being applied to the meter, the base or both.

As best shown by FIG. 2, which is a top view of the base 20, the base drain 30 provides an integral cross-shaped slew portion 34 at the bottom of a cradle portion 36 of the base 20 which supports the meter 10. With the help of gravity, the slew portion 34 as shaped does not allow liquid to pool at the bottom of the cradle portion 36 as liquid is directed downward towards the rear of cradle portion 36 to a drain hole 38. The drain hole 38 ensures that any liquid exits away from the base 20 and provided data port and power connector socket portions 40 and 42, respectively (FIGS. 3 and 4).

Figure 5:
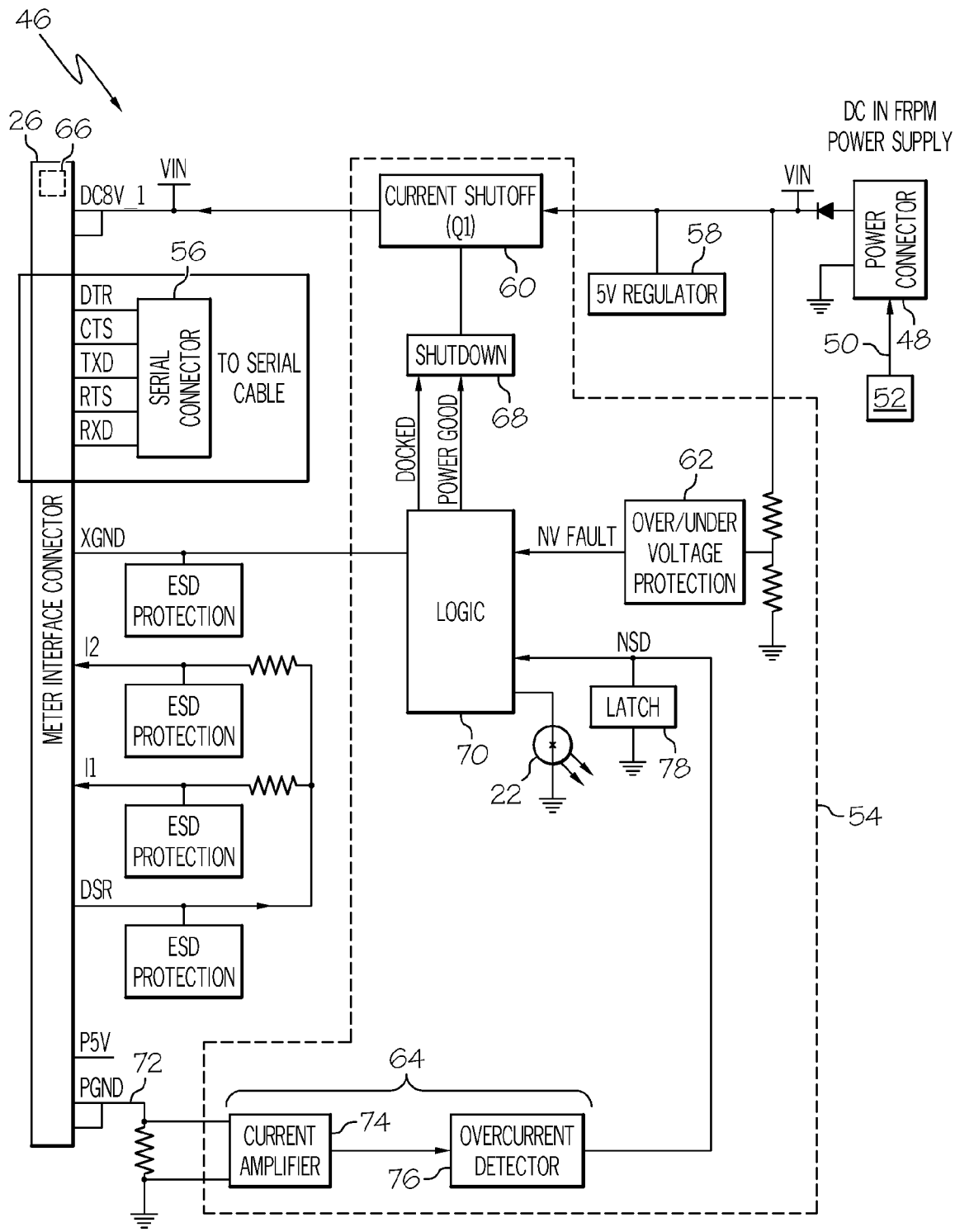
FIG. 5 is a schematic of an embodiment of an electrical system with protection circuitry according to the present invention.

Furthermore, the connector dam 32 prevents liquid from entering the internal cavity 44 of the base 20, which houses an electrical system 46 (FIG. 4) of the base. The connector dam 32 provides a gasket material (not shown) to seal the internal cavity 44 from ingress of liquid from around the portion of the meter interface connector 26 that protrudes upwards from the bottom of the cradle portion 36. Accordingly, together the base drain 30 and connector dam 32 prevent liquid pooling and liquid ingress should the meter or base be improperly cleaned. Reference is now also made to FIG. 5, which is a schematic of an embodiment of an electrical system 46 with protection circuitry 54 according to the present invention.

Power

The electrical system 46 of the docking station base provides a conduction path to an output terminal 66 (FIG. 5) of the meter interface connector 26 which connects to the meter 10 to recharge the battery 12. With the meter 10 cradled or docked in the base 20, the electrical system 46 supplies current to the battery 12 such that it may be recharged. In one embodiment, the electrical system 46 is provided power via a power connector socket 48 which is compatible with a power cord 50 from a power supply 52. In one embodiment, the power supply 52 is a voltage converter which converts energy from AC mains into sufficient DC current for charging the battery 12 of the meter 10. In another embodiment, the power supply 52 may be an external source providing DC power supply, such as for example, a battery pack. In other embodiments, the electrical system 46 may include an internal voltage converter such that AC main may be connected directly to the electrical system, or include an internal DC power supply.

In one embodiment, the electrical system 46 provides the meter 10 with an operating voltage ranging from about 8.5 to about 9.5 VDC, with less than about 100 mV peak to peak noise in order to supply sufficient output current to charge the battery 12. In other embodiments, other operating voltage ranges are possible and will depend on the power requirements of the hand-held meter and included battery. Additionally, although the voltage output available at the meter interface connector 26 is a relatively narrow voltage range, it is to be appreciated that the protection circuitry 54 of the electrical system 46 in one embodiment will still function properly with DC voltages from the power supply 52 ranging from 6 VDC to 15 VDC, and over a current range of 0 to 1.5 A with less than 100 mV peak-to-peak noise. In other words, as will be explained in greater detail in a later section, the protection circuitry 54 will provide a fault indication and disable the output voltage to the meter interface connector 26 should the operating voltage range from about 6.00 to about 8.49 VDC and about 9.51 to about 15.00 VDC.

In one embodiment, the output current to the meter 10 from the electrical system 46 via the meter interface connector 26 ranges from 0 to about 1.2 A. In another embodiment, the electrical system 46 via the meter interface connector 26 supplies three output current levels to the meter 10 under different operating states. In such an embodiment, the operating states include a battery constant-current (CC) charge mode, a battery constant-voltage (CV) charge mode, and a charger disable safe mode. In all modes, the meter 10 may still be operated when connected to base 20. The following conditions cause the current output of the electrical system 46 to go to the charger disable safe mode at any time: the meter 10 is not connected to the meter interface connector 26; the input voltage from the power supply 52 is out of a specified operating range high, which in one embodiment is greater than 9.5 V; the input voltage from power supply 52 is out of a specified operating range low, which in one embodiment is less than 8.5 V; or the current draw of meter 10 from the base 20 is greater than a specified operating range, which in one embodiment is greater than 1.2 A.

In one embodiment, when the electrical system 46 is in safe mode and senses that the meter 10 has been connected to the meter interface connector 26, i.e., docked, the electrical system goes to CC charge mode. After docking, the following conditions cause a transition to CV charge mode of electrical system 46: the time of the electrical system in CC charge mode is over a predetermined period, which in one embodiment is greater than 1 hour; or the output current is below a predetermined value, which in one embodiment is less than 800 mA. When the electrical system 46 is in CV charge mode, the following conditions cause a transition to safe mode: the meter 10 is disconnected from the base 20, i.e., undocked, or the time in CV charge mode is greater than a predetermined period, which in one embodiment is greater than 3 hours. In another embodiment, the internal hardware, software, and/or firmware 11 of the meter 10 is in control of the CC and CV charge modes. In such an embodiment, as long as the meter 10 is docked and the voltage and current are within limits, the electrical system 46 of the base 20 will not go to SAFE mode.

In one embodiment, the electrical system 46 will indicate the operating state with the visual indicator 22 on the front of the base 20. In one embodiment, CC and CV charge modes are indicated with the visual indicator 22 continually on with full illumination. In another embodiment, the CC charge mode may be indicated with the visual indicator 22 continually on but with less than full illumination, thereby providing a dimmed appearance to distinguish between the CC and CV modes. In the charger disable safe mode, the visual indicator 22 is either off or flashing if indicating a fault condition. As the fault conditions are explained more fully in a later section, attention is now drawn to the data connection of the base 20.

Data Connection

As mentioned previously above, the base 20 provides to the meter 10 a data connection to the remote system 16 or 18. This data connection is provided by an included data port connector 56. In one embodiment the data signals are passed between the meter 10 and the remote system 16 or 18 through the data port connector 56 without modification from the base 20. In one embodiment, the data port connector 56 provides a serial connection, such as a RS232, RS485, or USB compatible connector, and in other embodiments may provide a network interface card from a direct network connection. A more detailed discussion on the electrical system 46 and the included protection circuitry 54 is now provided hereafter.

Electrical System

With reference made mainly to FIG. 5, the general operation of the electrical system 46 and the included protection circuitry 54 is as follows. As illustrated, power from the power supply 52 is delivered to the electrical system 46 via the power connector 48 and is routed to a voltage regulator 58, which in one embodiment is rated at 5 volts. Power from the power supply 52 is also connected to the input of a current shutoff switch (Q1) 60 of the protection circuitry 54. When enabled, switch Q1 60 connects power from the power supply 52 to the meter interface connector 26. The output of the voltage regulator 58 provides a constant operating voltage for the internal circuitry in the base 10. As mentioned above, the meter interface connector 26 is the interface point between the electrical system 46 and the battery 12, as well as a providing a data interface between the serial connector 56 and the meter 10.

The protection circuitry 54 is arranged to monitor both the voltage deliverable to the meter 10 and the current drawn by the meter 10 from the electrical system 46. If either the voltage or the current is out of their specified ranges, the protection circuitry 54 will disconnect power to the meter interface connector 26, via the current shutoff switch 60. The protection circuitry 54 further comprises a voltage supervisor circuit 62 and a current monitoring circuit 64. It is to be appreciated that the protection circuitry 54 may be implemented as an analog circuit, a digital electronic circuit, and combination thereof. Additionally, the protection circuitry 54 is arranged to actuate the current shutoff switch 60 when one or more "fault" conditions are detected. The switch 60 provides a conduction path to shunt current away from the power output terminal 66 of the meter interface connector 26.

Voltage Supervisor

From the power connector 48, voltage is also connected to the voltage supervisor circuit 62. If voltage from the power connector 48 is outside a specified range, the voltage supervisor circuit 62 disconnects power to the meter interface connector 26 via enabling a shutdown circuit 68. When the shutdown circuit 68 is enabled, the current shutoff switch (Q1) 60 is disabled. Additionally, when the shutdown circuit 68 is enabled, a logic circuit 70 is enabled which controls the power to the visual indicator 22 to indicate a fault. When voltage from the power connector 48 returns to a normal, specified range, the power to the meter interface connector 26 is restored by the shutdown and logic circuits 68 and 70, respectively, returning the electrical system 46 to its original functional state. This restoration of power to the meter interface connector 26 in a voltage fault condition will occur when or if the meter 10 is connected thereto. It is to be appreciated that although power may be cut-off to the meter interface connector 26 when the meter 10 is not connected to the base 20, monitoring by the electrical system 46 for an out-of-range voltage condition will continue regardless of the meter 10 being docked to the base 20. The voltage supervisor circuit 62 also includes hysteresis to prevent the power from oscillating due to noise on the supply line.

Figure 6:
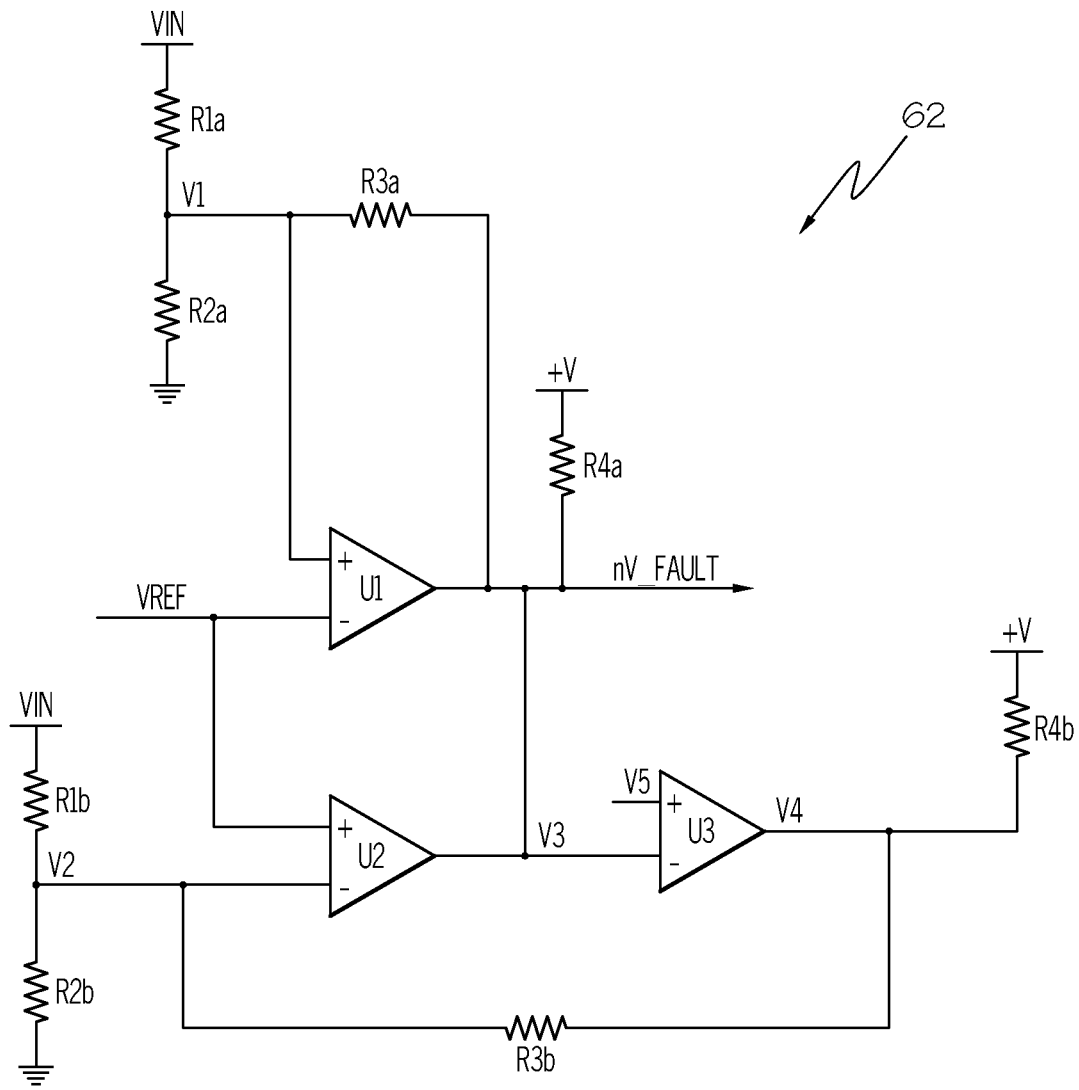
FIG. 6 is a schematic of an embodiment of a voltage supervisor circuit according to the present invention.

In one embodiment, illustrated by FIG. 6, the voltage supervisor circuit 62 is composed of two comparators U1 and U2, which controls an NV_FAULT output signal connected to the logic circuit 70 (FIG. 5). In particular, the upper comparator U1 will pull the nV_FAULT output signal low if the input voltage Vin from the power connector 48 falls below a predetermined threshold value, while the lower comparator U2 will pull the nV_FAULT output signal low if the input voltage Vin rises above a predetermined threshold value. The reference voltage VREF is supplied by a precision voltage reference (not shown). The pair of resistor dividers R1a and R2a, and R1b and R2b, set the nominal Vin divide rations for comparison voltages V1 and V2, respectively, while the feedback resistors R3a and R3b provide the hysteresis.

Resistors R4a and R4b are large enough in comparison to the feedback resistors R3a and R3b such that they must also be figured into the hysteresis equations. Op-amp U3 is set up as an inverter to flip the polarity of the hysteresis on the lower comparator U2, making the threshold go up when voltage V3 goes low. Voltage V5 is set by a voltage divider from the voltage regulator 58 (FIG. 5). In one embodiment, the inverter U3 requires a comparison voltage greater than half the voltage V5 because the hysteresis of low comparator U2 will not engage until inverter U3 can switch. The higher the voltage V5, the shorter the delay before inverter U3 can change polarities. By choosing a voltage V5 higher than the AND gate (not shown) that accepts nV_FAULT output signal as an input to the logic circuit 70, oscillations in voltages are blocked from reaching the current shutoff switch 60. Additionally, by choosing a high value for voltage V5, the time duration during which oscillations are possible is limited to just a few μs.

In one embodiment, components of the voltage supervisor circuit 62 were selected to make the V1 voltage equal to the reference voltage Vref when the supply voltage Vin was equal to a nominal trip point determined by equations (1)-(3), whereby when the output is high, V1=V1H, and when the output is low V1=V1L.

$$V1L := Vin \cdot \frac{R23}{R23 + R1} \quad (1)$$

$$V1H := \frac{R2 \cdot (R3 + R4) \cdot Vin + R1 \cdot R2 \cdot 5}{R1 \cdot (R3 + R4) + R2 \cdot (R3 + R4) + R1 \cdot R2} \quad (2)$$

$$R23 := \frac{R2 \cdot R3}{R2 + R3} \quad (3)$$

Equations (4) and (5) may be used to calculate the voltage Vin from the resistor and reference values. It is to be appreciated that VinL corresponds to V1L, and VinH corresponds to V1H (referenced to output state), but because of an inversion in the equations VinL is at a higher voltage than VinH.

$$VinL := VREF \frac{R1 + R23}{R23} \quad (4)$$

$$VinH := \frac{VREF \cdot \left[ \frac{R1 \cdot (R3 + R4) + R2 \cdot}{(R3 + R4) + R1 \cdot R2} \right] - 5 \cdot R1 \cdot R2}{R2 \cdot (R3 + R4)} \quad (5)$$

Current Monitoring

Turning back now to FIG. 5, the current monitoring circuit 64 disconnects power to the meter interface connector 26 if the current drawn by the meter 10 excesses a specified threshold value. The present inventors have found that power can short to ground in the situation when cleaning fluid contacts one of the interface connectors 26 or 28. In such a situation, cleaning fluid will be detected by monitoring the filtered DC value of the current flowing through the meter 10, wherein exceeding the specified threshold value is considered to be a fluid-induced current fault. However, it is also to be appreciated that a fault condition may also result from semiconductor processing defects such as a shorted resistor, mechanical stress, thermal stress, misuse such as utilizing a non-compliant power adapter, as well as others, which the protection circuitry may also detect.

From a ground terminal 72 of the meter interface connector 26, a current to voltage transformation occurs at a current sense amplifier 74 of the current monitoring circuit 64. The voltage output of the current sense amplifier 74 is connected to an over-current detector 76. If the specified threshold value is exceeded, the over-current detector enables the shutdown and logic circuits 68 and 70, respectively. As before, when the shutdown circuit 70 is enabled, the current shutoff switch 60 is disabled, thereby removing power from the meter interface connector 26. When the logic circuit 70 is enabled, the visual indicator 22 is controlled to indicate a fault. Additionally, when the over-current detector 76 is enabled, both the shutdown and logic circuits 68 and 70 are latched via enabling a latch circuit 78. When the latch circuit 78 is enable in the case of a current-induced fault, power is not restored to the meter interface connector 26 until power to the electrical system 46 is removed and reapplied, and the current fault no longer exists.

Current Sense Amplifier

Figure 7:
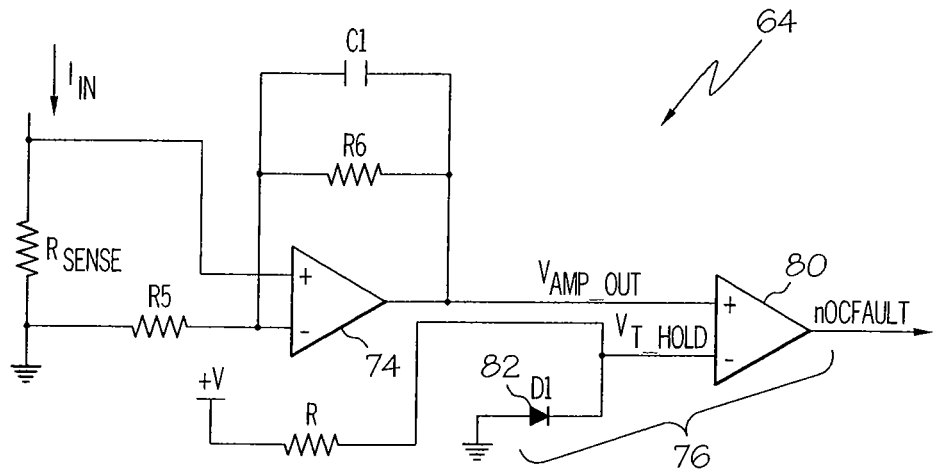
FIG. 7 is a schematic of an embodiment of an over-current monitoring circuit according to the present invention.

In one embodiment, illustrated by FIG. 7, the current sense amplifier 74 has a low side current sense amplifier topology, and converts an input current $I_{in}$ through resistor $R_{sense}$ to an appropriately scaled amplifier output voltage $V_{amp\_out}$. As shown, resistors R5 and R6 set the gain of the op-amp, and resistor R6 and capacitor C1 limit the bandwidth. Additionally, the current sense amplifier 74 is configured such that the return current flows through a current sense resistor $R_{sense}$ from the positive input to the negative input, thereby providing a positive output from the amplifier.

When the meter 10 is connected to the base 20 with power available at the meter interface connector 26, the current may briefly spike, exceeding the current limit threshold. However, the amplifier roll-off, as set by resistor R6 and capacitor C1, slows the signal enough to prevent such a current spike from triggering the over-current shutdown signal. Voltage output $V_{amp\_out}$ of the current sense amplifier 74 is dependent on the R6/R5 ratio as well as the value of the current sense resistor $R_{sense}$, and is defined by equation (6).

$$\frac{V_{amp\_out}}{I_{in}} = R_{sense} \cdot \left( \frac{R6}{R5} + 1 \right) \quad (6)$$

It is to be appreciated that the current sense resistor $R_{sense}$ is chosen as a small value to prevent a large voltage drop from disrupting circuit operation. In one embodiment, the gain resistors R5 and R6 are chosen to set the amplifier output voltage $V_{amp\_out}$ to full scale for input current values around 2 A. In one embodiment, the nominal gain is about 2.1 V/A.

Over-Current Detector

In the illustrated embodiment of FIG. 7, the over-current detector 76 comprises a comparator 80 with a threshold voltage $V_{t\_hold}$ set with a reference diode 82. The reference diode 80 is chosen such that the output signal nOCFAULT of the comparator 80 will go low when the output of the current sense amplifier 74 corresponds to a predetermined input current limit. In one embodiment, the nominal trip current is 1.19 A.

Latch

Figure 8:
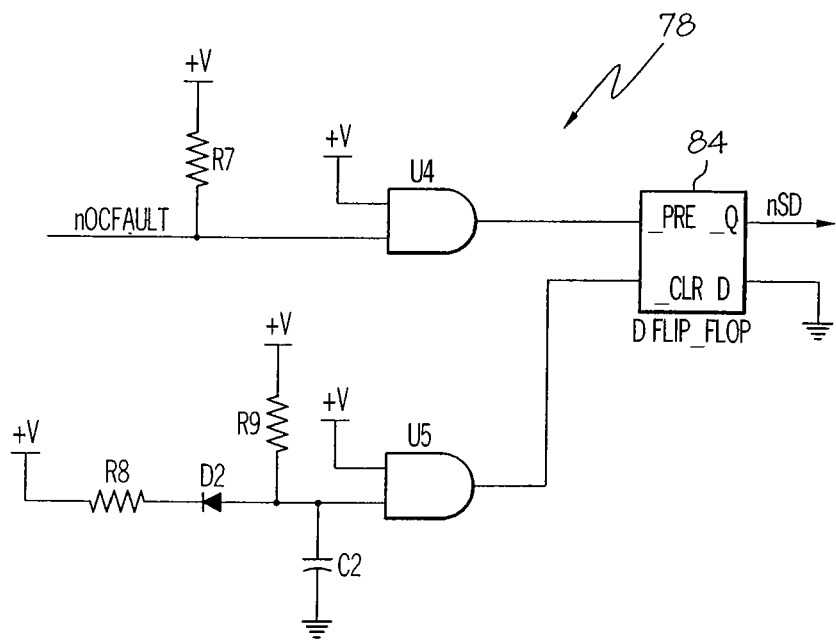
FIG. 8 is a schematic of an embodiment of a latch circuit according to the present invention.

In one embodiment shown by FIG. 8, the latch circuit 78 comprises a pair of AND gates U4 and U5, and a memory 84. In the illustrated embodiment, the memory is a D flip-flop, and in other embodiments may be any type of memory, bistable multivibrator, and the like. The latch circuit 78 is designed to hold its output signal nSD low after a current fault is signaled by the output signal nOCFAULT from the over-current detector 76 going low. It is to be appreciated that the output signal nSD will remain low even if the fault is cleared as indicated by nOCFAULT going high unless power to the power connector 48 (FIG. 5) is cycled off and on. The truth Table for the D flip-flop 84 is shown below in Table 1.

The latch truth Table 1 is referenced for the following explanation of the various latch states. In the illustrated embodiment, the underlines states will never occur, as the clock and D inputs to the D flip-flop 84 are pulled low. Additionally, as shown in FIG. 8, the Q output is unused.

TABLE 1

Latch truth Table

| Inputs | | | | Outputs | |
|---|---|---|---|---|---|
| _PRE | _CLR | CLK | D | Q | _Q (nSD) |
| L | H | X | X | H | L |
| H | L | X | X | L | H |
| L | L | X | X | H | H |
| H | H | ↑ | H | H | L |
| H | H | ↑ | L | L | H |
| H | H | L | X | Qo | _Qo |

When power is turned off, C2 is discharged as D2 and R8 ensure quick discharge as the +V supply goes to zero. Control_CLR will be held low until C2 can charge past the input threshold of AND gate U5.

TABLE 2

D flip-flop states on power up, no current fault condition

| Condition | _PRE | _CLR | _Q (nSD) |
|---|---|---|---|
| At power up, no fault | H | L | H |
| C2 charges, U5 out goes high | H | H | H |
| Current fault occurs (nOCFAULT low) | L | H | L |
| Current fault is cleared (nOCFAULT high) | H | H | L |
| Current fault is reintroduced (nOCFAULT low) | L | H | L |

Table 2 shows the state of the output signal nSD of the D flip-flop 84 upon the occurrence of a fault condition being indicated by the output signal nOCFAULT from the over-current detector 76 going low. As shown above, Table 2 demonstrates that latch circuit 78 will hold the output signal nSD low after it is first pulled low despite any activity on the input line _PRE of the D flip-flop 84 by the output signal nOCFAULT from the over-current detector 76.

If there is a persistent current fault detected at power up, the latch circuit 78 will engage as shown in the Table 3 below. Table 3 shows the state of the output signal nSD of the D flip-flop 84 upon the occurrence of a fault condition being indicated by the output signal nOCFAULT from the over-current detector 76 going low at power up. Additionally, Table 3 demonstrates that the latch circuit 78 will hold the output signal nSD of the D flip-flop 84 low after it is first pulled low despite any activity on the input line _PRE of the D flip-flop by the output signal nOCFAULT from the over-current detector 76. The output signal nSd of the latch circuit 78 is then used by the logic circuit 70 for current shutoff determinations as well as fault indication, which a discussion regarding is provided hereafter.

TABLE 3

D flip-flop states on power up with current fault condition

| Condition | _PRE | _CLR | _Q (nSD) |
|---|---|---|---|
| At power up, fault is present | L | L | H |
| C2 charges, U5 out goes high | L | H | L |
| Current fault is cleared (nOCFAULT low) | H | H | L |
| Current fault reintroduced (nOCFAULT low) | L | H | L |

Logic and Shutdown

Figure 9:
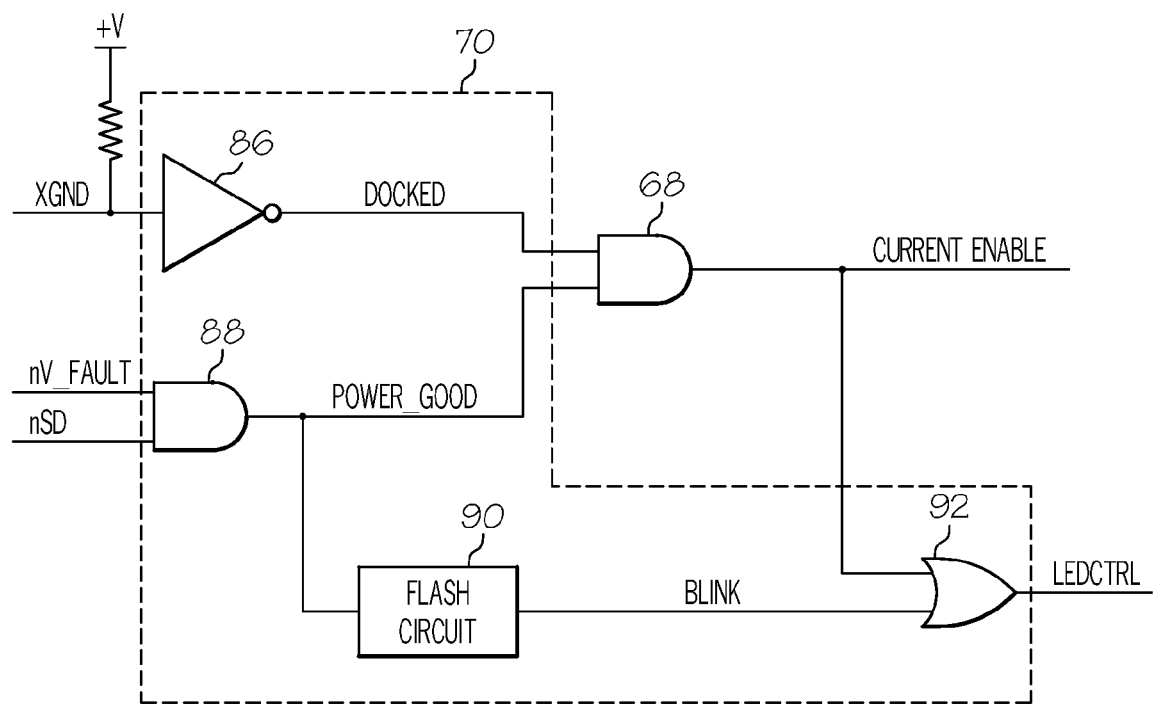
FIG. 9 is a schematic of an embodiment of logic circuitry according to the present invention.

In the illustrated embodiment shown by FIG. 9, the logic circuit 70 comprises an inverting buffer 86 and a first AND gate 88, and the shutdown circuit 68 is a second AND gate. When the meter 10 is connected to the meter interface connector 26 (FIG. 5), an XGND signal from the meter interface connector is low such that the output signal DOCKED of the inverting buffer 86 is high. The output signal DOCKED going low would indicated that the meter 10 is not connected to the meter interface connector 26, e.g., not docked to the base 20.

As mentioned above in a previous section, the nV_FAULT signal is the output signal of the voltage supervisor circuit 62. A high signal output nV_FAULT indicates that the voltage of the electrical system is within tolerance, and that a low signal output nV_FAULT indicates the voltage is outside of tolerance. Also as mentioned above in a previous section, a high output signal nSD from the current monitor circuit 64 indicates that the current draw is not excessive, whereas a low output signal nSD indicates excessive current draw. This signal is latched low after a failure until power is cycled and no fault remains.

The CURRENT_ENABLE signal controls the current switch Q1 as well as the visual indicator 22 via enabling the LEDCTRL output signal of the NOR gate 92 to go high. The CURRENT_ENABLE signal is high when the meter is docked (DOCKED=1), the voltage is in the proper range (nV_FAULT=1) and the over-current detector is not activated (nSD=1). Table 4 is a truth Table of the output of the shutdown circuit 68.

TABLE 4

CURRENT_ENABLE truth table

| DOCKED | nV_FAULT | nSD | POWER_GOOD | CURRENT_ENABLE |
|---|---|---|---|---|
| 0 | X | X | X | 0 |
| 1 | 0 | X | 0 | 0 |

TABLE 4-continued

CURRENT_ENABLE truth table

| DOCKED | nV_FAULT | nSD | POWER_GOOD | CURRENT_ENABLE |
|---|---|---|---|---|
| 1 | X | 0 | 0 | 0 |
| 1 | 1 | 1 | 1 | 1 |

Accordingly, output signal POWER_GOOD of the first AND gate 88 will be high when both current and voltage are within tolerance. Should the meter 10 be connected to the base 20 (DOCKED signal high) with the voltage and current within tolerance, a high output signal CURRENT_ENABLE of the shutdown circuit 68 (second AND gate) will provide power to the collector of the current shutdown switch 60, thereby enabling power to be provided to the meter interface connector 26. Should either of the signals DOCKED or POWER_GOOD go low, the CURRENT_ENABLE signal goes low, thereby removing power from the collector of the current shutdown switch 60 and cutting power to the meter interface connector 26.

Visual Indicator

The only operator interface with the base 20 is the visual indicator 22 (FIG. 5), which indicates power and meter docked status. If the meter 10 is docked and there is no power fault, the visual indicator 22 will be on continuously. If the meter 10 is not docked, the visual indicator 22 will be off, again if there is no fault. If a voltage or current fault is detected, then the visual indicator 22 will blink, regardless of whether the meter 10 is docked. In one embodiment, the visual indicator 22 is a single LED, and in other embodiments, may be any suitable illumination means.

To provide the above visual indications, as illustrated by FIG. 9, the logic circuit 70 further includes a flash circuit 90 and a NOR gate 92 which provides logic control to the visional indictor 22 (FIG. 5). As shown, the flash circuit 90 provides output signal BLINK. Output signal BLINK is low when POWER_GOOD signal is high, and will oscillates when POWER_GOOD signal is low. Table 5 is a truth Table of flash circuit 90. It is necessary to differentiate between the blinking state of the BLINK circuit and the solid on or off state. In Table 5, the BLINK output will be labeled 0B and 1B when blinking, 0 or 1 when not blinking

TABLE 5

Flash circuit truth table

| DOCKED | POWER_GOOD | CURRENT_ENABLE | BLINK | LED |
|---|---|---|---|---|
| 0 | 0 | 0 | 0B | Off (0) |
| 0 | 0 | 0 | 1B | On (1) |
| 0 | 1 | 0 | 0 | Off (0) |
| 1 | 0 | 0 | 0B | Off (0) |
| 1 | 0 | 0 | 1B | On (1) |
| 1 | 1 | 1 | 0 | On (1) |

Accordingly, if the meter 10 is not docked to the base 20, resulting in DOCKED signal going low and the output signal BLINK is also being low due to the POWER_GOOD signal being high, the control signal output LEDCTRL of the NOR gate 92 is low, thereby turning off the visual indicator 22. It is to be appreciated that since the protection circuitry 54 (FIG. 5) is powered before the current shutoff switch 60, should the POWER_GOOD signal go low, the LEDCTRL signal will go high in step with the BLINK signal oscillations, thereby flashing the visual indicator 22 to indicate a fault condition. It is also to be appreciated the protection circuitry 54 will continue to operate after fault until power is removed from the power connector 48. In one embodiment, the output signal BLINK will oscillate such that the visual indicator 22 will flash at a rate of 2 Hz+/−20%.

Flash Circuit

Figure 10:
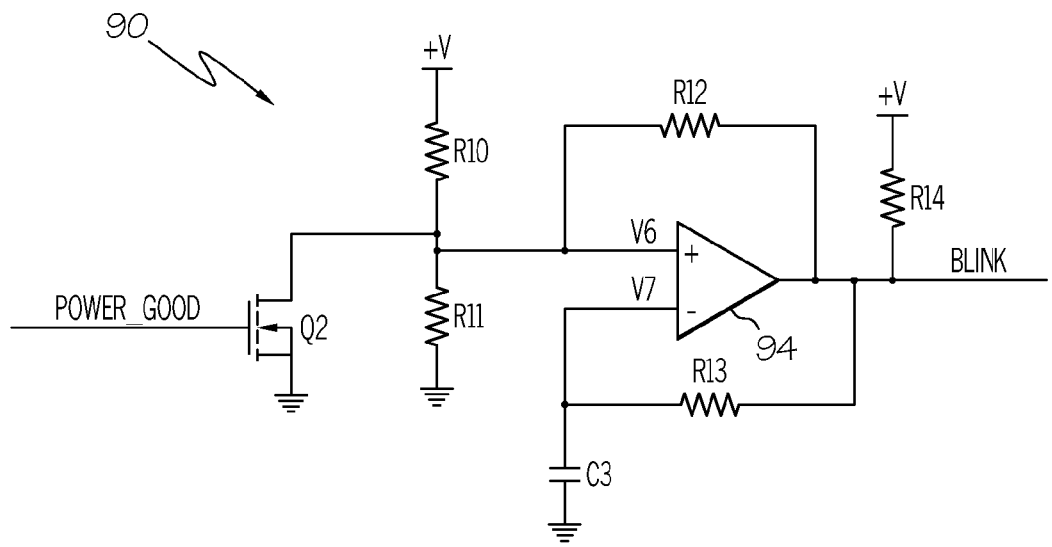
FIG. 10 is a schematic of an embodiment of flash circuitry according to the present invention.

In the embodiment shown by FIG. 10, the flash circuit 90 comprises a transistor Q2, and op-amp 94. As shown, when the POWER_GOOD signal is high, the collector of the transistor Q2 will be turn on and voltage V6 will be pulled low. Pulling voltage V6 will result in a continuous low signal out of the op-amp 94 (BLINK signal is low). When the POWER_GOOD signal is low, the collector of the transistor Q2 is open, and output signal BLINK of the op-amp 94 will begin to oscillate, as voltage V7 is pulled down with the charging cycles of capacitor C3. The frequency of the oscillation frequency is defined by equation (7).

$$f := \frac{1}{2 \cdot \left(R4C1 \cdot \ln\left(\frac{V6}{V7}\right)\right)} \quad (7)$$

The above description and drawings are only to be considered illustrative of exemplary embodiments, which achieve the features and advantages of the present invention. Modification and substitutions to specific process conditions and structures can be made without departing from the spirit and scope of the present invention. Accordingly, the invention is not to be considered as being limited by the foregoing description and drawings, but is only limited by the scope of the appended claims.

What is claimed is:

1. A docking station which provides electrical protection between a rechargeable battery provided in a handheld meter and an external power supply which charges the rechargeable battery via the docking station, and which mitigates the risk of damage to the handheld meter and a base due to dendrite formation from non-recommended cleaning practices, the docking station being removably connectable to the power supply and comprising:

the base which removably accommodates the handheld meter;

an electrical system which comprises:

a meter interface connector having an output terminal provided in the base which supplies power from the power supply to the rechargeable battery upon both the docking station being connected to the power supply and the handheld meter being accommodated in the base which removably couples the rechargeable battery to the output terminal, a ground terminal provided in the base which grounds the rechargeable battery upon the handheld meter being accommodated in the base which removably couples the rechargeable battery to the ground terminal, protection circuitry which comprises:
- a current monitoring circuit which is directly connected to the ground terminal which detects an over-current condition of the electrical system upon both the rechargeable battery being coupled to the output and ground terminals and the docking station being coupled to the power supply, and which outputs an over-current fault detection signal responsive to the over-current condition, and
- a voltage supervisor circuit which monitors for an out-of-range voltage condition of the power supply when connected to the docking station and at least during and after the rechargeable battery is coupled to both the output and ground terminals, and which outputs a voltage fault detection signal responsive to detection of the out-of-range voltage condition both with and without the rechargeable battery being coupled to both the output and ground terminals,
- a switch responsive to the fault detection signals which inhibits the supply of power from the power supply to the output terminal upon detection of either the over-current condition or out-of-range voltage condition and
- a visual indicator responsive to the fault detection signals which provides a visual indication upon detection of either the over-current condition or out-of-range voltage condition;

wherein the protection circuitry provides protection against dendrite formation on the meter interface connector by being configured to automatically disconnect power from the meter interface connector when the meter and/or the base are oversaturated with a cleaning practice solution.

2. The docking station of claim 1, wherein the output and ground terminals are part of the meter interface connector provided in the base, and the base provides a base drain with an integral cross-shaped slew portion and a connector dam configured to seal the base around at least a portion of the meter interface connector.

3. The docking station of claim 1, wherein the base provides a data connector which couples the meter to a remote system or network upon the meter being accommodated in the base.

4. The docking station of claim 1, wherein the current monitoring circuit outputs the over-current condition upon detection of current flowing through the battery exceeding a predetermined value.

5. The docking station of claim 1, wherein the current monitoring circuit comprises a current sense amplifier provided in a low side current sense amplifier topology.

6. The docking station of claim 1, wherein the current monitoring circuit comprises a current sense amplifier, wherein the current sense amplifier is configured to convert an input current $I_{in}$ from the ground terminal through a resistor $R_{sense}$ to an appropriately scaled amplifier output voltage $V_{amp\_out}$.

7. The docking station of claim 1, wherein the current monitoring circuit comprises an amplifier connected to an over-current detector, and the over-current fault detection signal is output of the over-current detector.

8. The docking station of claim 1, wherein the current monitoring circuit comprises an amplifier connected to an over-current detector, the over-current detector comprises a comparator with a threshold voltage Vt_hold set with a reference diode, and wherein the reference diode is chosen such that the over-current fault detection signal of the comparator will go low when output of the current sense amplifier corresponds to a predetermined input current limit.

9. The docking station of claim 1, wherein when the over-current condition is detected by the current monitoring circuit, the docking station is configured to latch the switch in a current shutoff mode which cuts power to the output terminal, wherein the docking station is configured to unlatch the switch if power from the power supply is cycled and the over-current condition is not detected.

10. The docking station of claim 1, further comprising a latch circuit, wherein when the over-current condition is detected by the current monitoring circuit, the latch circuit is configured to latch the switch in a current shutoff mode which cuts power to the output terminal, and unlatch the switch if power from the power supply is cycled and the over-current condition is not detected.

11. The docking station of claim 1, further comprising a latch circuit, the latch circuit comprises logic and memory providing an output signal having first and second states, the first state indicating that the over-current condition is not detected, and the second state indicating the over-current condition is detected, wherein when the over-current condition is detected by the current monitoring circuit, the latch circuit is configured to latch the switch in a current shutoff mode which cuts power to the output terminal by the logic being configured to hold the output signal of the memory in the second state until power from the power supply is cycled and the over-current condition is not detected.

12. The docking station of claim 1, wherein the out-of-range voltage condition is defined as a voltage from the power supply being outside a specified range, wherein the voltage supervisor circuit is further configured to restore power to the output terminal when power from the power supply is in the specified range.

13. The docking station of claim 1, wherein the voltage supervisor circuit includes hysteresis to prevent power in the docking station from oscillating due to noise from the power supply.

14. The docking station of claim 1, wherein the voltage supervisor circuit comprises first and second comparators which control the voltage fault detection signal, the voltage fault detection signal having a first state which indicates no out-of-range condition is detected, and a second state which indicates the out-of-range condition is detected, wherein the first comparator is configured to place the voltage fault detection signal in the second state if power from the power supply is below a predetermined value, and the second comparator is configured to place the voltage fault detection signal in the second state if power from the power supply is above a predetermined value.

15. The docking station of claim 1, wherein the switch comprises a transistor.

16. The docking station of claim 1, wherein the switch comprises a transistor having a collector connected to a shut-down circuit of the docking station, wherein the shutdown circuit is configured to enable the collector if the rechargeable battery is coupled to the output terminal and neither the over-current condition nor out-of-range voltage condition is detected by the docking station.

17. The docking station of claim 1, wherein the docking station is configured to switch the switch such that power is provided to the output terminal when voltage of the power supply returns to a predetermined range after an out-of-range voltage condition with no over-current condition being detected by the current monitoring circuit.

18. The docking station of claim 1, wherein the current monitoring circuit comprises a current sense amplifier, a capacitor $C_1$, and three resistors ($R_5$, $R_6$, $R_{sense}$), wherein the current sense amplifier is configured to convert an input current $I_{in}$ from the ground terminal through resistor $R_{sense}$ to an appropriately scaled amplifier output voltage $V_{amp\_out}$, which is defined by $$V_{amp\_out} = I_{in} R_{sense} \left( \frac{R5}{R6} + 1 \right),$$

and wherein resistors $R_5$ and $R_6$ set gain of the amplifier, and resistor $R_6$ and capacitor $C_1$ limit bandwidth.

19. The docking station of claim 1, wherein the visual indicator blinks the visual indication when either the voltage supervisor circuit detects the out-of-range voltage condition or the current monitoring circuit detects the over-current condition, and illuminates the visual indicator continuously when both the rechargeable battery is coupled to the output terminal and neither the over-current nor out-of-range conditions are detected.

20. The docking station of claim 1, wherein the meter interface connector is configured to connect the hand-held meter to the base, and wherein:
the electrical system via the meter interface connector supplies three output current levels to the meter under different operating states, the operating states comprising a battery constant- current (CC) charge mode that the electrical system is configured to go into when the meter has been connected to the meter interface connector by docking, a battery constant-voltage (CV) charge mode that the electrical system is configured to transition to from the CC charge mode after a predetermined time, and a charger disable safe mode configured to indicate a fault condition, and in all modes, the meter is operable when connected to the base; and
a current output of the electrical system is caused to go to the charger disable safe mode when the meter is not connected to the meter interface connector, when the input voltage from the power supply is out of a specified operating range, and when a current draw of the meter from the base is greater than the specified operating range which is narrower than a voltage range over which the protection circuitry will still function properly and which is less than a current range over which the protection circuitry will still function properly.

21. The docking station of claim 20, wherein the electrical system is caused to go to the charger disable safe mode when the current draw of the meter from the base is greater than 1.2 Amps.

22. A docking station which provides electrical protection between a rechargeable battery provided in a handheld meter and an external power supply which charges the rechargeable battery via the docking station, and which mitigates the risk of damage to the handheld meter and a base due to dendrite formation from non-recommended cleaning practices, the docking station being removably connectable to the power supply and comprising:
the base which removably accommodates the handheld meter;
a meter interface connector having an output terminal provided in the base which supplies power from the power supply to the rechargeable battery upon both the docking station being connected to the power supply and the handheld meter being accommodated in the base which removably couples the rechargeable battery to the output terminal;
a ground terminal provided in the base which grounds the rechargeable battery upon the handheld meter being accommodated in the base which removably couples the rechargeable battery to the ground terminal;
protection circuitry which comprises:
a current monitoring circuit which detects an over-current condition of the rechargeable battery upon both the rechargeable battery being coupled to the output and ground terminals and the docking station being coupled to the power supply, and which outputs an over-current fault detection signal responsive to the over-current condition;
a voltage supervisor circuit which before, during, and after coupling the rechargeable battery to both the output and ground terminals continuously monitors for an out-of-range voltage condition of the power supply when the power supply is connected to the docking station, and which outputs a voltage fault detection signal responsive to detection of the out-of range voltage condition both with and without the rechargeable battery being coupled to both the output and ground terminals;
a switch responsive to the fault detection signals which inhibits the supply of power from the power supply to the output terminal upon detection of either the over-current condition or out of-range voltage condition, wherein when the over-current condition is detected by the current monitoring circuit, the docking station is configured to latch the switch in a current shutoff mode which cuts power to the output terminal, wherein the docking station is configured to unlatch the switch if power from the power supply is cycled and the over-current condition is not detected, and wherein the docking station is configured to switch the switch such that power is provided to the output terminal when voltage of the power supply returns to a predetermined range after an out-of-range voltage condition with no over-current condition being detected by the current monitoring circuit; and
a visual indicator responsive to the fault detection signals which provides a visual indication upon detection of either the over-current condition or out-of-range voltage condition;
wherein the protection circuitry provides protection against dendrite formation on the meter interface connector by being configured to automatically disconnect power from the meter interface connector when the meter and/or base are over-saturated with a cleaning practice solution.

23. A method of providing electrical protection in a docking station which removably accommodates a handheld meter providing a rechargeable battery and which is removably connectable to an external power supply, and mitigating the risk of damage to the handheld meter and a base due to dendrite formation from non-recommended cleaning practices the method comprising:
providing an output terminal of the docking station which supplies power from the power supply to the rechargeable battery upon both the docking station being connected to the power supply and the handheld meter being accommodated in the base which removably couples the rechargeable battery to the output terminal;
providing a ground terminal of the docking station which grounds the rechargeable battery upon the handheld meter being accommodated in the base which removably couples the rechargeable battery to the ground terminal;
monitoring continuously voltage of the power supply when connected to the docking station and at least during and after the rechargeable battery is coupled to both the output and ground terminals via a voltage supervisor circuit of the docking station, wherein the voltage supervisor circuit outputs a voltage fault detection signal responsive to detection of an out-of-range voltage condition both with and without the rechargeable battery being coupled to both the output and ground terminals;

monitoring current of the power supply when the rechargeable battery is coupled to the output and ground terminals via a current monitoring circuit of the docking station, wherein the current monitoring circuit outputs an over-current fault detection signal responsive to detection of an over-current condition;

providing a voltage fault detection signal responsive to the out-of-range voltage condition being detected by the voltage supervisor circuit of the docking station;

inhibiting power from the power supply to the output terminal when either the over-current condition or out-of-range voltage condition is detected via a switch of the docking station that is responsive to the fault detection signals; and providing a visual indication upon detection of either the over-current condition or out-of-range voltage condition via a visual indicator responsive to the fault detection signals;

wherein the protection circuitry provides protection against dendrite growth on a meter interface connector by being configured to automatically disconnect power from the meter interface connector when the meter and/or the base are over-saturated with a cleaning practice solution.

* * * * *